United States Patent [19]
Byington

[11] Patent Number: 6,079,078
[45] Date of Patent: Jun. 27, 2000

[54] CHIP AND DUST COLLECTION APPARATUS

[75] Inventor: Ronald J. Byington, O'Fallon, Mo.

[73] Assignee: The Boeing Company, St. Louis, Mo.

[21] Appl. No.: 09/176,436

[22] Filed: Oct. 21, 1998

[51] Int. Cl.[7] .................................................. B23B 47/34
[52] U.S. Cl. .......................... 15/339; 15/415.1; 83/100; 144/252.1; 408/67; 451/456
[58] Field of Search ................... 15/339, 415.1; 408/67; 144/252.1; 83/100; 451/456

[56] References Cited

U.S. PATENT DOCUMENTS

| | | | |
|---|---|---|---|
| 2,829,908 | 4/1958 | Brochetti et al. .................... | 15/339 X |
| 3,339,435 | 9/1967 | Heitz ................................ | 144/252.1 X |
| 3,837,383 | 9/1974 | Ko .................................... | 144/252.1 X |
| 4,184,226 | 1/1980 | Loevenich ............................ | 15/415.1 |
| 4,200,417 | 4/1980 | Hager et al. ........................... | 408/67 |
| 4,621,462 | 11/1986 | Hinshaw ............................... | 51/273 |
| 4,921,375 | 5/1990 | Famulari ............................... | 408/67 |
| 5,100,270 | 3/1992 | Dowdle et al. ......................... | 409/132 |
| 5,292,210 | 3/1994 | Nowick ................................. | 408/67 |
| 5,332,343 | 7/1994 | Watanabe et al. ..................... | 409/136 |
| 5,423,359 | 6/1995 | Aigner ................................. | 144/252 |
| 5,522,683 | 6/1996 | Kakimoto et al. ..................... | 408/13 |
| 5,615,983 | 4/1997 | Hoekstra .............................. | 409/132 |
| 5,904,453 | 5/1999 | Gavia ................................... | 408/67 |

FOREIGN PATENT DOCUMENTS

| | | | |
|---|---|---|---|
| 230252 | 11/1963 | Austria ................................ | 15/339 |
| 2434641 | 1/1976 | Germany ............................. | 408/67 |
| 2012043 | 7/1979 | United Kingdom .................. | 15/415.1 |
| 2159619 | 12/1985 | United Kingdom .................. | 15/339 |

*Primary Examiner*—Chris K. Moore
*Attorney, Agent, or Firm*—Alston & Bird LLP

[57] ABSTRACT

A chip and dust collection apparatus attached to a machine tool having a spindle and a cutter for removing chips and dust near the cutter at the time of cutting is disclosed. The invention comprises a vacuum supply apparatus and a hollow vacuum hood rotatably attached to the machine tool around the spindle so that the cutter projects forwardly through the vacuum hood. A hose connecting, the vacuum supply apparatus to the vacuum hood is also provided. A flexible sleeve is attached the vacuum hood so that the cutter projects through the flexible sleeve. The flexible sleeve is more flexible along the longitudinal sleeve axis than normal to the longitudinal sleeve axis. The flexible sleeve is also pivotable at one end to a plurality of orientations not parallel with the longitudinal sleeve axis. Further, a hollow foot is attached to the flexible sleeve. A sealing end of the foot has a flange extending outwardly and back toward the machine tool. This arrangement allows the foot to remain against the workpiece as it is translated across the workpiece even if the cutter is not normal to the surface of the workpiece. The flange causes the foot to pivot if it engages elevations on the workpiece higher than the elevation on the workpiece at the cutter. As the machine tool translates across the workpiece, the chips and dust created by the cutter are pulled through the foot, the flexible sleeve, the vacuum hood and the hose into the vacuum supply apparatus.

20 Claims, 5 Drawing Sheets

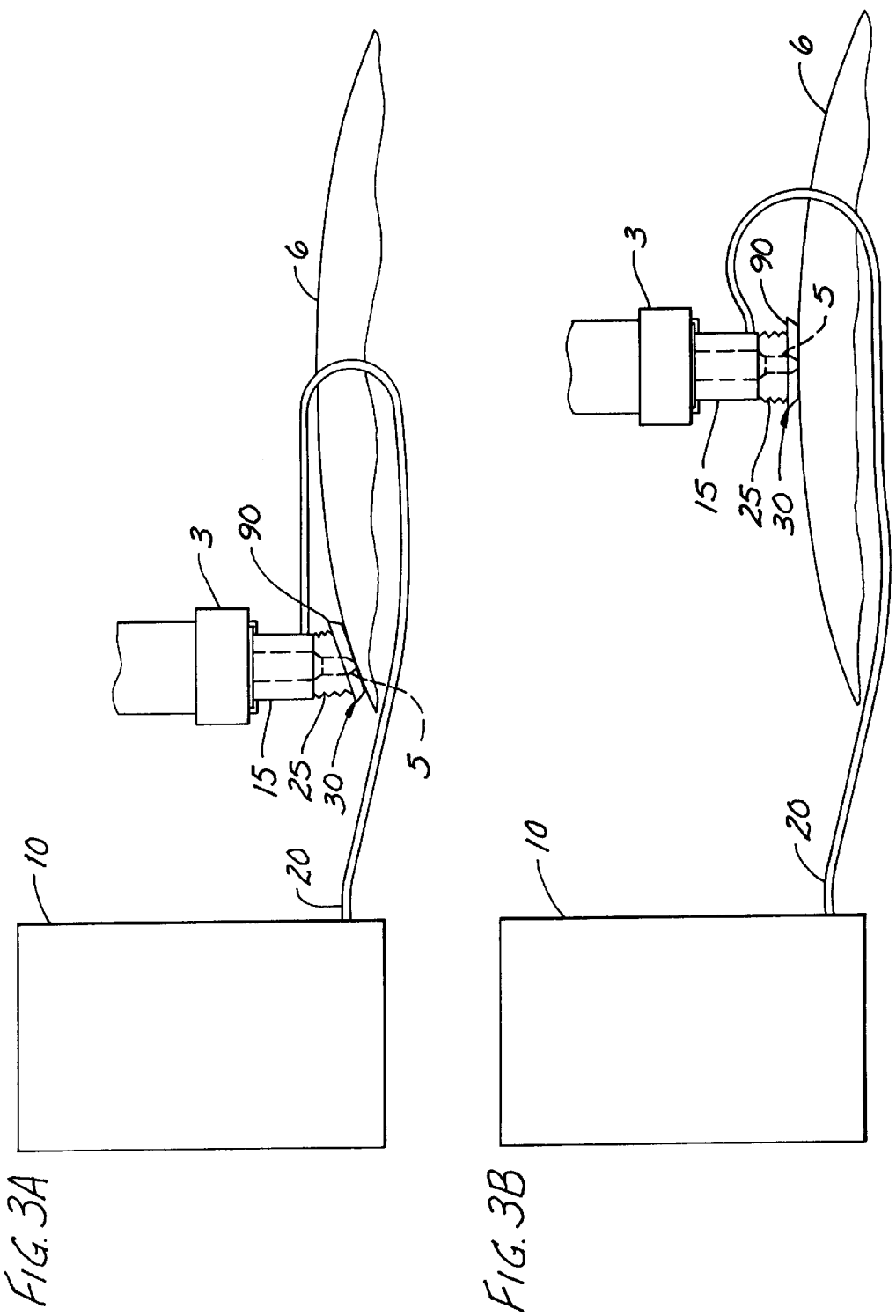

CHIP AND DUST COLLECTION APPARATUS

BACKGROUND OF THE INVENTION

1. Field of the Invention

This invention relates generally to chip and dust collection apparatuses for removing chips and dust generated during milling processes. More specifically, this invention relates to chip and dust collection apparatuses for removing chips and dust near the cutting tool at the time of cutting.

2. Description of the Related Art

Milling processes are used throughout industry to produce desired configurations such as machined parts, dies and tooling. Such processes involve using a milling machine that translates a rotary cutter along a series of paths through the workpiece material. As the cutter impinges upon the workpiece, material is removed in the form of chips or dust. After all of the paths have been completed, the remaining uncut workpiece material is the desired configuration being produced.

The chips or dust produced during this process present several problems to the manufacturer. Often, the chips or dust have an uncompressed volume that is an order of magnitude greater than the volume of the solid removed from the workpiece, thus it is desirable to remove the chips and dust efficiently to maintain a clean work environment. Additionally, the material may be hazardous, making it desirable to collect the chips and dust during the milling process to minimize health risks to the milling machine operators. Further, certain materials may be abrasive in nature, making it desirable to collect the chips or dust during the milling process to prevent them from damaging the milling machine.

It is well known to use chip and dust collection apparatuses to collect chips and dust during material removal processes similar to milling. For example, it is known in the prior art to attach sleeves to vacuum sources surrounding the cutter and sealing against the workpiece. It is also known to uses sleeves that traverse along the cutter to accommodate different length cutters or changes in distance relative to the workpiece, as in drilling. The references also show brushes as a means to keep dust particles from escaping the chip and dust collection apparatus. A major problem with these devices is that they are unsuited for use when milling complex contours or when using long cutters. If the cutter is traversing a path in which the cutter's longitudinal axis is not normal to the workpiece surface, there will necessarily be gaps between the chip and dust collection apparatus and workpiece when the chip and dust collection apparatus only translates along the cutter axis. This results in poor chip arid dust collection. The use of brushes on the chip and dust collection apparatuses fails to adequately solve this problem because they deflect in a direction normal to the cutter's longitudinal axis. This can result in the brush becoming entangled in the cutter, damaging the brush, the chip and dust collection apparatus, the cutter, or the workpiece. This problem is exacerbated when the cutter is longer, requiring the use of longer bristles.

SUMMARY OF THE INVENTION

The present inventions solves the aforementioned problems by providing a chip and dust collection apparatus that maintains an adequate seal against the workpiece even if the cutter is not normal to the workpiece and that will not interfere with the cutter during cutting operations.

More particularly, the invention provides a vacuum supply apparatus and a generally cylindrical hollow vacuum hood rotatably attached to tie machine around the spindle so that the cutter projects forwardly through the vacuum hood. A hose connecting the vacuum supply apparatus to the side opening of tile vacuum hood is also provided. A generally cylindrical flexible sleeve is attached concentrically to the vacuum hood so that the cutter projects through the flexible sleeve. The flexible sleeve is fabricated from a wire coil reinforced hose that is more flexible in a direction lying generally along the longitudinal sleeve axis than in a direction generally normal to the longitudinal sleeve axis. The flexible sleeve is also pivotable at one end to a plurality of orientations not parallel with the length of the flexible sleeve Further, a generally cylindrical hollow foot is concentrically attached to the flexible sleeve so that the cutter projects through the foot. The sealing end of the foot has a flange extending outwardly and back toward the machine tool. This arrangement allows the foot to remain against the workpiece as it is translated across the workpiece even if th, cutter is not normal to the surface of the workpiece. As the machine tool translates across the workpiece, the chips and dust created by the cutting are pulled through the foot, the flexible sleeve, the vacuum hood and the hose into the vacuum supply apparatus.

BRIEF DESCRIPTION OF THE DRAWINGS

The foregoing and other advantages and features of the present invention, and the manner in which the same are accomplished, will become more readily apparent upon consideration of the following detailed description of the invention taken in conjunction with the accompanying drawings, which illustrate a preferred and exemplary embodiment, and wherein:

FIGS. 3A through 3C are sequential schematic views of the chip and dust collecting apparatus illustrating the movement of the apparatus is it is translated by the milling machine across a contoured workpiece.

DETAILED DESCRIPTION OF THE INVENTION

Figure 1:
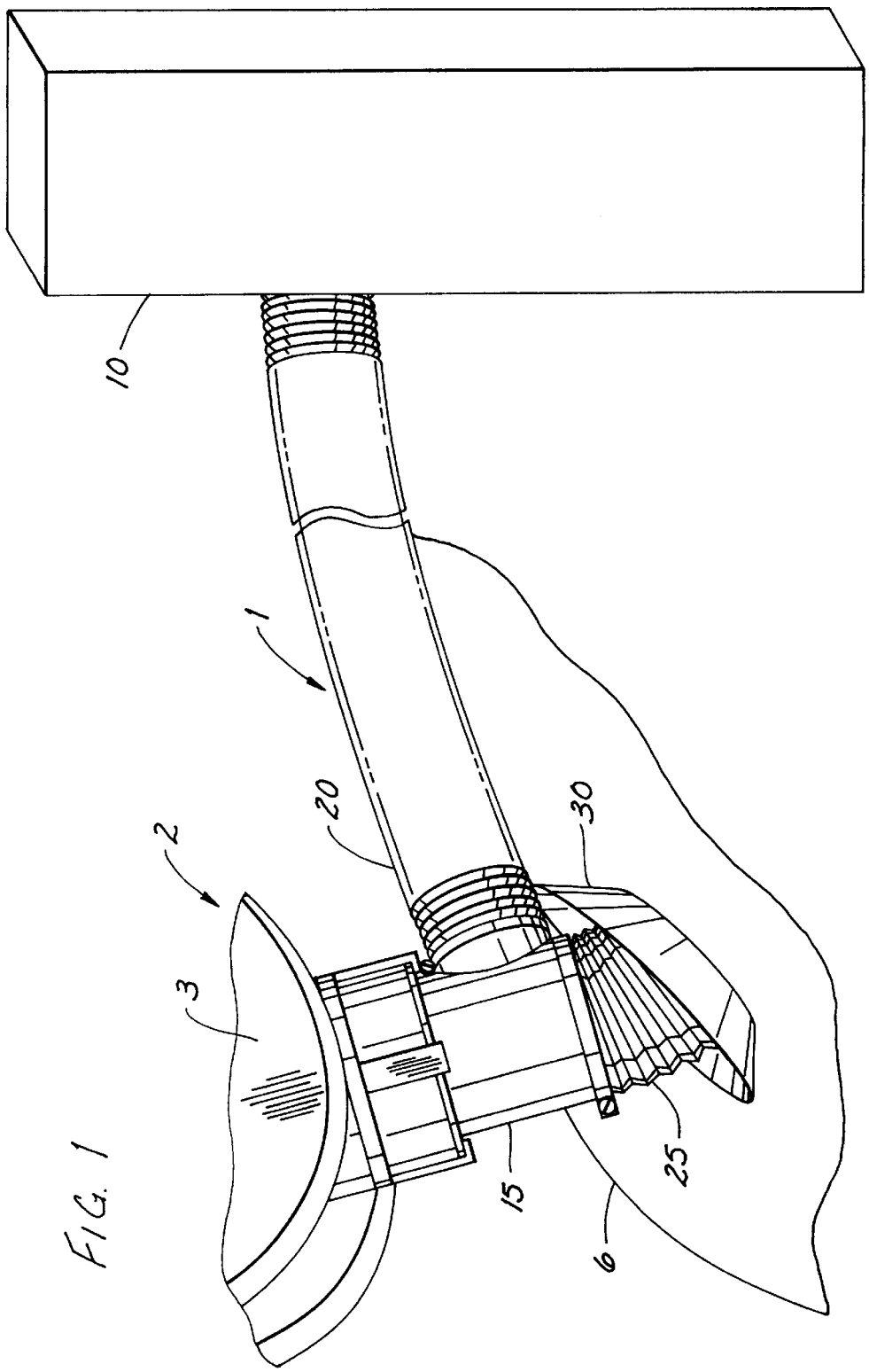
FIG. 1 is a perspective view of a chip and dust collecting apparatus attached to a milling machine according to one embodiment of the present invention.
Figure 2:
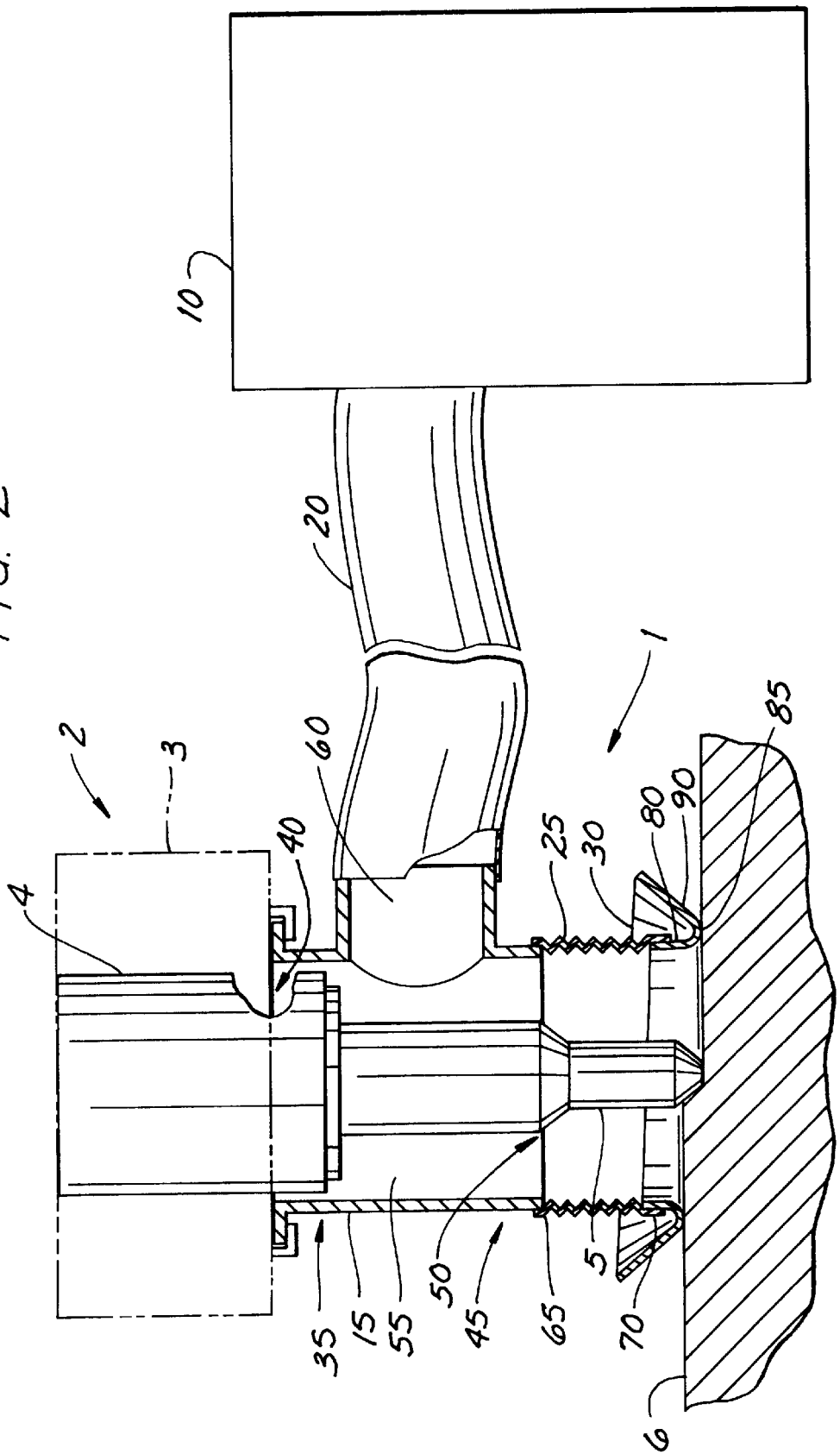
FIG. 2 is a partial cross sectional view further illustrating the embodiment of the chip and dust collecting apparatus of FIG. 1.

Shown in FIGS. 1 and 2 is a chip and dust collecting apparatus 1 formed in accordance with this invention attached to a machine tool 2. The machine tool 2 includes a body 3 that holds a rotatable spindle 4. A cutter 5 is attached to the forward end of the spindle. Such machine tools, spindles and cutters are well known in the art and comprise no part of this invention.

When the rotating cutter is brought into contact with a workpiece 6, the contacted portion is cut into chips or ground into dust or both. These chips or dust often have a volume that is an order of magnitude greater than the volume of the solid removed from the workpiece. Depending on the workpiece material, the chips or dust may be hazardous to the machine tool operators or may have deleterious effects on the machine tool itself. The chip and dust collecting apparatus formed in accordance with this invention is directed to the efficient removal of these dust particles from the work area.

Referring still to FIGS. 1 and 2, the preferred embodiment of the invention particularly comprises a vacuum supply apparatus 10, a hollow, vacuum hood 15, a hose 20 connecting the vacuum hood to the vacuum supply apparatus, a flexible sleeve 25 and a hollow foot 30.

The vacuum supply apparatus 10 in the preferred embodiment is a commercially available vacuum pump having the power to remove the volume and mass of chips and dust being generated during the cutting process, though any other means for generating the required suction may be employed. The vacuum supply apparatus also includes an outlet or container for collecting the chips and dust removed during operation.

The hollow vacuum hood 15 in the preferred embodiment is a hollow cylinder. The vacuum hood 15 has a back end 35 having a back opening 40, a forward end 45 having a forward opening 50 and a side wall 55 having a side opening 60. The vacuum hood 15 is attached at the back end 35 to the body 3 of the machine tool 2 to encircle the spindle 4 so that the cutter 5 projects through the vacuum hood 15. In the preferred embodiment the back end 35 is rotatably attached to the body 3. This rotatable attachment may be accomplished through any one of a number of attachment means know in the art.

The hose 20 connects the vacuum supply apparatus 10 and the side opening 60 of the vacuum hood 15. The hose 20 can be fabricated from any material that will transmit the suction generated by the vacuum supply apparatus 10 to the vacuum hood 15. The hose will also permit flow of the chips and dust from the vacuum hood 15 to the vacuum supply apparatus 10. In a preferred embodiment, the hose 20 is fabricated from flexible rubber tubing that is reinforced to prevent collapse under the vacuum.

Referring to the sequential views of FIGS. 3A–3C, it can be seen that providing a rotatable attachment of the vacuum hood 15 to the body 3 and a hose 20 fabricated from a flexible material, the vacuum supply source 10 can be placed in a fixed location. The flexing of the hose 20 and rotation of the vacuum hood 15 offset changes in distance and orientation brought about by translation of the body 3, spindle 4, cutter 5, vacuum hood 15, flexible sleeve 25 and foot 30 over the workpiece 6.

Figure 4:
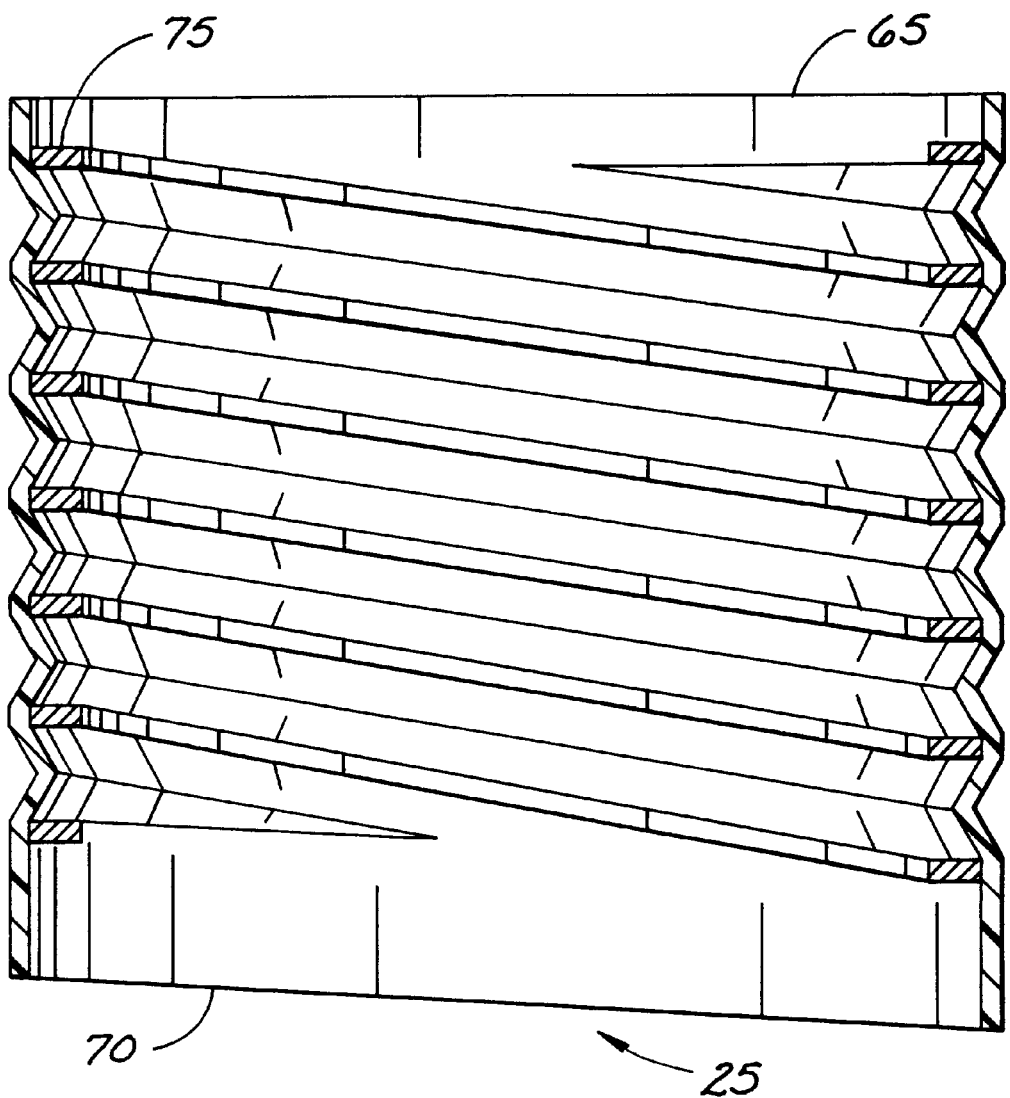
FIG. 4 is a cross sectional view of the flexible sleeve according to one embodiment of the present invention.

The flexible sleeve 25 connects the vacuum hood 15 to the foot 30. The flexible sleeve 25 has a first end 65 and a second end 70. The first end 65 is fixedly attached to the forward end 45 of the vacuum hood 15 concentrically with the forward opening 50 of the vacuum hood 15, so that the flexible sleeve 25 encircles the cutter 5 and the cutter 5 projects out the second end 70. In a preferred embodiment, the flexible sleeve 25 is more flexible along a longitudinal sleeve axis, generally extending from the first end 65 to the second end 70 and parallel to the length of the cutter 5, than in a direction generally normal to that axis. Additionally, the second end 70 of the flexible sleeve 25 is pivotable to a plurality of orientations not parallel to the longitudinal sleeve axis. In a preferred embodiment, the desired flexibility and pivotability is accomplished by fabricating the flexible sleeve from a wire coil 75 reinforced hose. The hose material can be any number of available materials. In a preferred embodiment the hose material is a reinforced cloth which collapses when compressed, but stretches minimally under tension. When reinforced with a wire coil 75, the flexible sleeve 25 is significantly more flexible along the longitudinal sleeve axis than normal to the longitudinal sleeve axis. Additionally, the second end 70 of the flexible sleeve 25 can be pivoted to a plurality of orientations not parallel with longitudinal sleeve axis. In the preferred embodiment, as shown in FIG. 4, the wire of the wire coil 75 has a roughly rectangular cross section, similar to a SLINKY® spring toy. This provides additional stiffness normal to the longitudinal sleeve axis.

The foot 30 has an attachment end 80 and a sealing end 85. The foot 30 is fixedly attached at the attachment end 80 to the second end 70 of the flexible sleeve 25 concentrically with the flexible sleeve 25, so that the foot 30 encircles the cutter 5 and the cutter 5 projects out toward the sealing end 85. In a preferred embodiment, the sealing end 85 has a flange 90 that projects radially outward and back toward the attachment end 80, and the foot 30 is fabricated from a transparent material. For the purposes of this invention, transparent means clear enough to determine if the chips or dust being collected are becoming clogged in the area around the cutter.

As illustrated in FIGS. 3A–3C, the flange 90 coupled with the pivoting of the flexible sleeve 25 allow the foot to remain against the workpiece 6 as it is translated across the workpiece 6 even if the cutter 5 is not normal to the surface of the workpiece 6. The flange 90 creates a ramp that pivots the foot 30 if it encounters higher elevations on the workpiece 6 than the elevation of the workpiece 6 at the cutter 5. As the machine tool 2 translates across the workpiece, the chips and dust created by the cutting are pulled through the foot 30 through the flexible sleeve 25, the vacuum hood 15, the hose 20 and into the vacuum supply apparatus 20.

While the present invention has been described in relation to preferred embodiments, it is understood that various alterations, substitutions of equivalents and other changes can be made without departing from the spirit of the invention. An example would be the use of a ball joint at the end of a collapsible sleeve to accomplish the pivoting action of the flexible sleeve. Accordingly, reference should be made to the appended claims, rather than to the foregoing specification, as indicating the scope of the invention.

What is claimed is:

1. A chip and dust collecting apparatus for a machine tool that includes a body, said dust collecting apparatus comprising:
   a. a vacuum supply apparatus;
   b. a hollow vacuum hood having a back opening, a forward opening, a side opening and an axis extending from the back opening toward the forward opening, said vacuum hood being attached at the back opening to the body;
   c. a hose connecting the vacuum supply apparatus to the side opening of the vacuum hood;
   d. a flexible sleeve having a first end, a second end and an axis extending from the first end toward the second end, said sleeve being attached at the first end to the forward opening of the vacuum hood so that the flexible sleeve axis and the vacuum hood axis are generally parallel; and
   e. a hollow foot having an attachment end, a sealing end and a foot axis extending from the attachment end to the sealing end, said hollow foot being attached at the attachment end to the second end of the flexible sleeve, wherein said hollow foot also has a side wall extending between the attachment end and the sealing end which has a continuous, solid surface that is free of any openings.

2. The chip and dust collecting apparatus for a machine tool that includes a body, said dust collecting apparatus comprising:

a. a vacuum supply apparatus;

b. a hollow vacuum hood having a back opening, a forward opening, a side opening and an axis extending from the back opening toward the forward opening, said vacuum hood being attached at the back opening to the body;

c. a hose connecting the vacuum supply apparatus to the side opening of the vacuum hood;

d. a flexible sleeve having a first end, a second end and an axis extending from the first end toward the second end, said sleeve being attached at the first end to the forward opening of the vacuum hood so that the flexible sleeve axis and the vacuum hood axis are generally parallel; and e. a hollow foot having an attachment end, a sealing end and a foot axis extending from the attachment end to the sealing end, said hollow foot being attached at the attachment end to the second end of the flexible sleeve, wherein the sealing end of the foot comprises a flange projecting outwardly and back toward the attachment end of the foot.

3. The chip and dust collecting apparatus of claim 1, wherein the flexible sleeve is more flexible in a direction along the flexible sleeve axis than in a direction normal to the longitudinal sleeve axis.

4. The chip and dust collecting apparatus of claim 1, wherein the second end of the flexible sleeve is pivotable so that the foot axis can be pivoted to a plurality of positions that are not parallel with the longitudinal sleeve axis.

5. The chip and dust collecting apparatus of claim 1, wherein the flexible sleeve comprises a wire coil reinforced hose.

6. The chip and dust collecting apparatus of claim 5, wherein the wire coil is made of metal.

7. The chip and dust collecting apparatus for a machine tool that includes a body, said dust collecting apparatus comprising:

a. a vacuum supply apparatus;

b. a hollow vacuum hood having a back opening, a forward opening, a side opening and an axis extending from the back opening toward the forward opening, said vacuum hood being attached at the back opening to the body;

c. a hose connecting the vacuum supply apparatus to the side opening of the vacuum hood;

d. a flexible sleeve having a first end, a second end and an axis extending from the first end toward the second end, said sleeve being attached at the first end to the forward opening of the vacuum hood so that the flexible sleeve axis and the vacuum hood axis are generally parallel, wherein the flexible sleeve comprises a wire coil reinforced hose, wherein the wire coil is made of metal, and wherein the wire has a generally rectangular cross section, said cross section having a long axis and a short axis, said long axis lying in a direction generally normal to the flexible sleeve axis; and e. a hollow foot having an attachment end, a sealing end and a foot axis extending from the attachment end to the sealing end, said hollow foot being attached at the attachment end to the second end of the flexible sleeve.

8. The chip and dust collecting apparatus for a machine tool that includes a body, said dust collecting apparatus comprising:

a. a vacuum supply apparatus;

b. a hollow vacuum hood having a back opening, a forward opening, a side opening and an axis extending from the back opening toward the forward opening, said vacuum hood being attached at the back opening to the body;

c. a hose connecting the vacuum supply apparatus to the side opening of the vacuum hood;

d. a flexible sleeve having a first end, a second end and an axis extending from the first end toward the second end, said sleeve being attached at he first end to the forward opening of the vacuum hood so that the flexible sleeve axis and the vacuum hood axis are generally parallel; and e. a hollow foot having an attachment end, a sealing end and a foot axis extending from the attachment end to the sealing end, said hollow foot being attached at the attachment end to the second end of the flexible sleeve, wherein the vacuum hood is rotatably attached to the body so that the vacuum hood, the flexible sleeve, and the foot rotate about the vacuum hood axis.

9. The chip and dust collecting apparatus for a machine tool that includes a body, said dust collecting apparatus comprising:

a. a vacuum supply apparatus;

b. a hollow vacuum hood having a back opening, a forward opening, a side opening and an axis extending from the back opening toward the forward opening, said vacuum hood being attached at the back opening to the body;

c. a hose connecting the vacuum supply apparatus to the side opening of the vacuum hood;

d. a flexible sleeve having a first end, a second end and an axis extending from the first end toward the second end, said sleeve being attached at the first end to the forward opening of the vacuum hood so that the flexible sleeve axis and the vacuum hood axis are generally parallel; and e. a hollow foot having an attachment end, a sealing end and a foot axis extending from the attachment end to the sealing end, said hollow foot being attached at the attachment end to the second end of the flexible sleeve, wherein the foot is made of a transparent material.

10. A chip and dust collecting apparatus for a machine tool that includes a body, said dust collecting apparatus comprising:

a. a vacuum supply apparatus;

b. a hollow vacuum hood having a back opening, a forward opening, a side opening and an axis extending from the back opening toward the forward opening, said vacuum hood being attached at the back opening to the body;

c. a hose connecting the vacuum supply apparatus to the side opening of the vacuum hood;

d. a flexible sleeve having a first end, a second end and an axis extending from the first end toward the second end, said sleeve being concentrically attached at the first end to the forward opening of the vacuum hood so that the flexible sleeve axis and the vacuum hood axis are generally parallel, said flexible sleeve being more flexible in a direction along the flexible sleeve axis than in a direction normal to the flexible sleeve axis; and e. a hollow foot having an attachment end, a sealing end and a foot axis extending from the attachment end to the sealing end, said hollow foot being concentrically attached at the attachment end to the second end of the flexible sleeve, said sealing end comprising a flange projecting outwardly and back toward the attachment end of the foot.

11. The chip and dust collecting apparatus of claim 10, wherein the second end of the flexible sleeve is pivotable so that the foot axis can be pivoted to a plurality of positions that are not parallel with the flexible sleeve axis.

12. The chip and dust collecting apparatus of claim 11, wherein the foot is made of a transparent material.

13. The chip and dust collecting apparatus of claim 10, wherein the flexible sleeve comprises a wire coil reinforced hose.

14. The chip and dust collecting apparatus of claim 13, wherein the wire coil is made of metal.

15. The chip and dust collecting apparatus of claim 13, wherein the wire has a generally rectangular cross section, said cross section having a long axis and a short axis, said long axis lying in a direction generally normal to the flexible sleeve axis.

16. The chip and dust collecting apparatus of claim 10, wherein the vacuum hood is rotatably attached to the body so that the vacuum hood, the flexible sleeve, and the foot rotate about the vacuum hood axis.

17. A chip and dust collecting apparatus for a machine tool that includes a body, said dust collecting apparatus comprising:

a. a vacuum supply apparatus;

b. a hollow vacuum hood having a back opening, a forward opening, a side opening and an axis extending from the back opening toward the forward opening, said vacuum hood being attached at the back opening to the body;

c. a hose connecting the vacuum supply apparatus to the side opening of the vacuum hood;

d. a flexible sleeve having a first end, a second end and an axis extending from the first end toward the second end, said sleeve being concentrically attached at the first end to the forward opening of the vacuum hood so that the flexible sleeve axis and the vacuum hood axis are generally parallel, said flexible sleeve being more flexible in a direction along the flexible sleeve axis than in a direction normal to the flexible sleeve axis, said flexible sleeve comprising a wire coil reinforced hose that is more flexible along the flexible sleeve axis than in a direction normal to the longitudinal sleeve axis and pivotable at the second end to a plurality of orientations not parallel with the flexible sleeve axis; and e. a hollow foot having an attachment end, a sealing end and a foot axis extending from the attachment end to the sealing end, said hollow foot being concentrically attached at the attachment end to the second end of the flexible sleeve, said sealing end comprising a flange projecting outwardly and back toward the attachment end of the foot.

18. The chip and dust collecting apparatus of claim 17, wherein the wire is made of metal and has a generally rectangular cross section, said cross section having a long axis and a short axis, said long axis being generally normal to the flexible sleeve axis.

19. The chip and dust collecting apparatus of claim 17, wherein the vacuum hood is rotatably attached to the body so that the vacuum hood, the flexible sleeve, and the foot rotate about the vacuum hood axis.

20. The chip and dust collecting apparatus of claim 17, wherein the foot is made of a transparent material.

* * * * *